(12) United States Patent
Matsukawa et al.

(10) Patent No.: US 7,954,969 B2
(45) Date of Patent: Jun. 7, 2011

(54) ILLUMINATING DEVICE FOR LIQUID CRYSTAL PANEL (75) Inventors: Kazuyuki Matsukawa, Kobe (JP); Masao Kamada, Neyagawa (JP); Wataru Tanaka, Katano (JP); Kazuki Watanabe, Hirakata (JP); Isao Nara, Agatsuma-gun (JP); Yasuo Uemoto, Iga (JP)

(73) Assignee: Panasonic Electric Works Co., Ltd., Osaka (JP)

( * ) Notice: Subject to any disclaimer, the term of this patent is extended or adjusted under 35 U.S.C. 154(b) by 545 days.

(21) Appl. No.: 11/994,724

(22) PCT Filed: Jul. 5, 2006

(86) PCT No.: PCT/JP2006/313432
§ 371 (c)(1),
(2), (4) Date: Jan. 4, 2008

(87) PCT Pub. No.: WO2007/007621
PCT Pub. Date: Jan. 18, 2007

(65) Prior Publication Data
US 2009/0168404 A1 Jul. 2, 2009

(30) Foreign Application Priority Data
Jul. 7, 2005 (JP) .................................. 2005-199293
Jun. 27, 2006 (JP) .................................. 2006-177062

(51) Int. Cl.
*G09F 13/04* (2006.01)

(52) U.S. Cl. ...... 362/97.2; 362/97.1; 362/235; 362/236; 362/240; 362/246; 362/247; 362/296.01

(58) Field of Classification Search ............... 362/97.1, 362/97.2, 246, 247, 235, 236, 240, 296.01
See application file for complete search history.

(56) References Cited

U.S. PATENT DOCUMENTS

2002/0048176 A1* 4/2002 Ruda et al. .................... 362/551
2006/0104083 A1* 5/2006 Kwon .......................... 362/559
2006/0221611 A1* 10/2006 Noh et al. ..................... 362/247

FOREIGN PATENT DOCUMENTS
JP 63-078923 U 5/1988
(Continued)

OTHER PUBLICATIONS

International Search Report for PCT/JP2006/313432 mailed Oct. 10, 2006.
Taiwanese Office Action for the Application No. 095124985 dated Nov. 24, 2010.

*Primary Examiner* — Ali Alavi
*Assistant Examiner* — Mary Zettl
(74) *Attorney, Agent, or Firm* — Cheng Law Group, PLLC (57) ABSTRACT

Light which tries to enter a diffuser plate 3 at an angle which exceeds an angle at which a percentage of reflected light increases rapidly (that is, the incidence angle θ=70 degrees) is all reflected by a reflecting surface 21 and then enters the diffuser plate 3. Therefore, a pseudo light source is formed by light which was collected near a connection point between adjacent reflecting surfaces 21 out of the emitted light of the discharge lamps 1. So, the brightness between the adjacent discharge lamps 1 is increased, and it is possible to reduce unevenness in brightness. Furthermore, since the discharge lamp 1 is housed inside the reflecting surface 21 whose cross-sectional shape is a parabola, it is possible to reduce the distance between a reflecting plate 2 and the diffuser plate 3, as compared with the prior art, and to reduce the thickness dimension in the anteroposterior direction.

6 Claims, 6 Drawing Sheets

FOREIGN PATENT DOCUMENTS

| | | |
|---|---|---|
| JP | 07-282612 A | 10/1995 |
| JP | 2003-31003 A | 1/2003 |
| JP | 2004-012728 A | 1/2004 |
| JP | 2005-024746 A | 1/2005 |

* cited by examiner

ILLUMINATING DEVICE FOR LIQUID CRYSTAL PANEL

TECHNICAL FIELD

The present invention relates to an illuminating device for a liquid crystal panel which illuminates a transmissive liquid crystal panel from behind.

BACKGROUND ART

In recent years, a big-screen display device and a TV receiver which use a transmissive liquid crystal panel have spread rapidly. The transmissive liquid crystal panel needs an illuminating device (so-called backlight) which illuminates the transmissive liquid crystal panel from behind. With upsizing of the liquid crystal panel, the illuminating devices are also getting larger, and the number of the light sources (straight-tube type discharge lamps) used have continued to rise. However, if the number of the discharge lamps is increased, power consumption of the illuminating device is also increased, and, as a result, power consumption of the display device with a liquid crystal panel and a illuminating device, and the TV receiver are also increased. Meanwhile, although it is necessary to reduce the number of the discharge lamps which are used so as to reduce the power consumption of the illuminating device for a liquid crystal panel, if the number of the discharge lamps is simply reduced, unevenness in brightness becomes large, whereby image quality is degraded.

So, in the prior art, an illuminating device for a liquid crystal panel which can suppress unevenness in brightness while reducing the number of the discharge lamps is disclosed (see, Japanese Patent Application Laid-Open No. 2005-24746. Hereinafter, called Patent document 1.). In the illuminating device for a liquid crystal panel, two reflecting mirrors each of which has a semi-elliptical surface in cross-section are provided alongside each other in such a way that each other's ones of the focuses overlap each other, and light sources (discharge lamps) are disposed at the other focuses, whereby light reflected by each reflecting mirror forms an image of the light source at the overlapped one focuses, which makes believe as if another light source exists between the two light sources.

However, in the prior illuminating device for a liquid crystal panel of Patent document 1, since it is necessary to dispose a discharge lamp, which is a light source, at a position of one focus of the reflecting mirror, it is necessary to secure a certain amount of distance between the reflecting mirror and a diffuser plate which is disposed in front of the reflecting mirror. As a result, there is a problem that a thickness of the illuminating device is increased.

DISCLOSURE OF THE INVENTION

In view of the above problem, the object of the present invention is to provide an illuminating device for a liquid crystal panel capable of reducing unevenness in brightness while preventing an increase of the thickness in an anteroposterior direction and reducing the number of the discharge lamps at the same time.

The present invention relates to an illuminating device for a liquid crystal panel which illuminates a transmissive liquid crystal panel from behind, which includes a plurality of straight-tube type discharge lamps arranged roughly parallel to a back surface of the liquid crystal panel, a reflecting plate disposed behind the discharge lamps to reflect light emitted from the discharge lamps forward, and a plate-shaped diffuser plate disposed between the liquid crystal panel and the discharge lamps to diffuse incident light. The reflecting plate has a plurality of reflecting surfaces each of which has a parabolic shape in cross section in a direction perpendicular to an axis direction of the discharge lamps and is formed into a gutter shape along the axis direction of the discharge lamps to house each discharge lamp inside it. And, adjacent reflecting surfaces are connected to each other on a side nearer to the diffuser plate than the discharge lamps so as to form a pseudo light source by light collected near a connection point between the reflecting surfaces out of the emitted light from the discharge lamps.

In the present invention, since the pseudo light source is formed by the light collected near the connection point between the adjacent reflecting surfaces out of the light emitted from the discharge lamps, it is possible to increase the brightness between the adjacent discharge lamps and to reduce the unevenness in brightness. Furthermore, since the plurality of reflecting surfaces are connected to each other on a side nearer to the diffuser plate than the discharge lamps between adjacent two discharge lamps (in other words, each discharge lamp is housed inside the reflecting surface), it is possible to reduce the distance between the reflecting plate and the diffuser plate, as compared with the prior art, and to suppress the thickness dimension in the anteroposterior direction.

Preferably, an incline for reflecting the emitted light of the discharge lamp to the reflecting surface located outside the innermost part of the reflecting surface is formed at the innermost part of the reflecting surface which faces the discharge lamp.

Preferably, a distance between the reflecting plate and the diffuser plate, that is, a distance between the connection point of the adjacent reflecting surfaces and the diffuser plate is set so that the reflected light which goes beyond the connection point and reflected by the back surface of the diffuser plate out of the emitted light of the discharge lamp housed inside one reflecting surface can be reflected by the reflecting surface located adjacent to the above one reflecting surface.

Preferably, the incline is extended to the outside of a projected area of the discharge lamp with respect to the innermost part of the reflecting surface.

When the incline is formed, it is preferable that, in the reflecting surface, regular reflectance of portions other than a back portion of the reflecting surface (that is, the back portion of the reflecting surface which includes the incline) is set to be smaller than that of the back portion of the reflecting surface.

Preferably, a discharge lamp support member for supporting the discharge lamp is provided at the innermost part of the reflecting surface which faces the discharge lamp.

Preferably, a diffuser plate support member which makes contact with the diffuser plate from the back surface side of the diffuser plate to support the diffuser plate is provided at the connection point of the reflecting surfaces in the reflecting plate.

BEST MODE FOR CARRYING OUT THE INVENTION

As shown in FIGS. 3 to 6, the illuminating device of this embodiment includes: a plurality of (twelve in this embodiment) straight-tube type discharge lamps 1 arranged roughly parallel to a back surface of the liquid crystal panel, a reflecting plate 2 disposed behind the discharge lamps 1 to reflect light emitted from the discharge lamps 1 forward (upward in FIG. 3), a plate-shaped diffuser plate 3 disposed between the liquid crystal panel and the discharge lamps 1 to diffuse incident light, a lighting device (not shown) for supplying power to the discharge lamps 1 (electrodes of the discharge lamps) through terminal pins 1a provided at both ends of each discharge lamp 1 to illuminate the discharge lamp, two circuit substrates 4 on which at least a part of the circuit parts for constituting the lighting device is mounted on and which are disposed on the back side of the reflecting plate 2, a diffuser sheet 5 disposed in front of the diffuser plate 3, a lens sheet 6 disposed in front of the diffuser sheet 5, an optical sheet 7 disposed in front the lens sheet 6, a holding frame 8 disposed in front of the optical sheet 7, and a metal frame 9 which sandwiches the diffuser plate 3 and the three sheets 5 to 7 between itself and the reflecting plate 2 through the holding frame 8 and sandwiches the liquid crystal panel (not shown) between itself and the holding frame 8 to hold the liquid crystal panel.

Each discharge lamp 1 is a cold cathode fluorescent lamp having a rod-shaped glass tube, a pair of electrodes (not shown) provided both ends in the glass tube, and terminal pins 1a each of which is connected to the electrode at its one end and is derived from the glass tube to the outside. A diameter of the glass tube is a few millimeters, and the entire length thereof is several dozen centimeters. The terminal pin 1a is bent backward at a roughly right angle.

The diffuser plate 3 is formed into a thin-walled flat-plate shape from a translucent material, such as acrylic resin. The diffuser plate 3 diffuses the light emitted from the discharge lamps 1 to apply the light forward, and it has hook-shaped cutouts 3a at respective four corners, and has recess parts 3b each of which is depressed inward at middle parts of respective edges in a direction perpendicular to the longitudinal direction.

The circuit substrate 4 comprises a printed circuit board which is a strip-shaped insulated substrate on which a wiring pattern is printed, and circuit components (not shown) for constituting the lighting device e.g. an inverter circuit for lighting the discharge lamps 1 are mounted thereon. Connection parts 4a into which the terminal pins 1a of the discharge lamps 1 are inserted are aligned and mounted at regular intervals on one end edge of the circuit substrate 4 in the longitudinal direction of the circuit substrate 4. Each connection part 4a has a housing with a insertion hole (not shown) into which the terminal pin 1a is inserted, and a blade receiver (not shown) for receiving the terminal pin 1a housed in the housing and inserted through the insertion hole. The terminal pin 1a is electrically connected to the lighting device through the blade receiver. Since such a lighting device is well-known, diagrammatic representation and explanation are omitted.

The optical sheet 7 separates incident light into a perpendicular polarization component and a horizontal polarization component and transmits them to illuminate the liquid crystal panel. The diffuser sheet 5 mainly performs a deviation action of the outputted light from the diffuser plate 3 and a diffusion action of light retroreflected by the lens sheet 6. The lens sheet 6 mainly performs a deviation action of the outputted light from the diffuser sheet 5. Each of the three sheets 5 to 7 has cutouts and recess parts having the same shapes and the same dimensions as the cutouts and the recess parts of the diffuser plate 3 at the same positions as the diffuser plate 3. Since the function and the material and so on of these three sheets are well-known, a detailed explanation is omitted here.

The holding frame 8 is a molding of synthetic resin having a rectangular frame shape, and is disposed on the front side of the optical sheet 7. The metal frame 9 is formed into a rectangular frame shape from a metal material such as aluminum, and is attached to the front side of the reflecting plate 2 through the holding frame 8 to support the liquid crystal panel between itself and the holding frame 8 and to support the diffuser plate 3 and the three sheets 5 to 7 between itself and the reflecting plate 2 through the holding frame 8. The metal frame 9 and the reflecting plate 2 may be connected to each other by an appropriate method, for example, by screws or caulking.

Figure 1A:
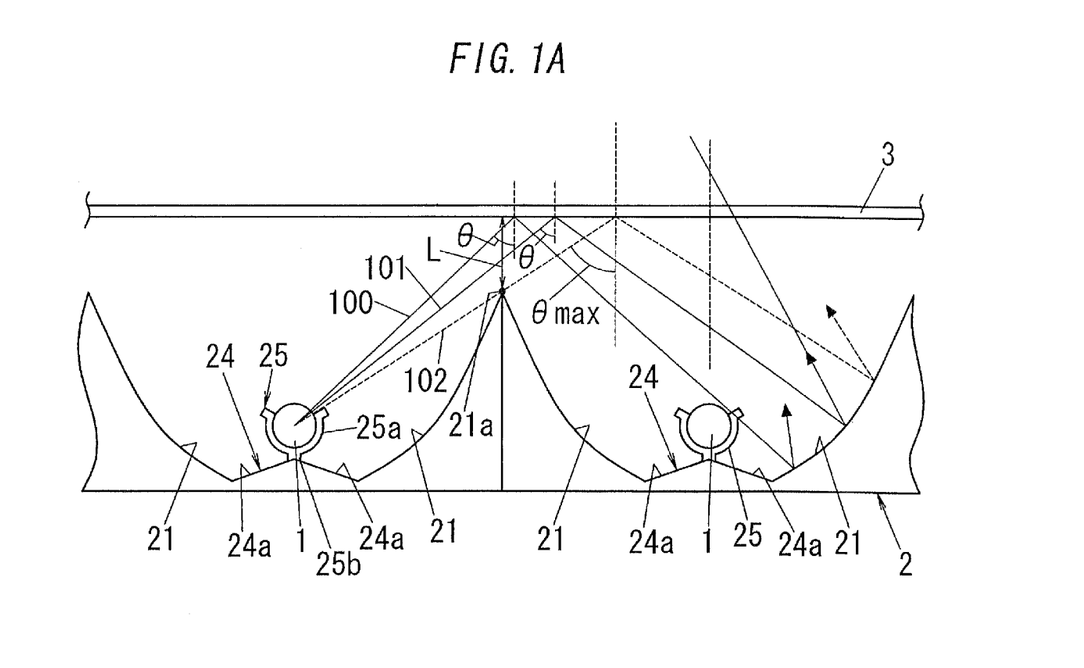
FIG. 1A is a side view of reflecting plates and diffuser plates of a illuminating device for a liquid crystal panel in accordance with an embodiment of the present invention.
Figure 4:
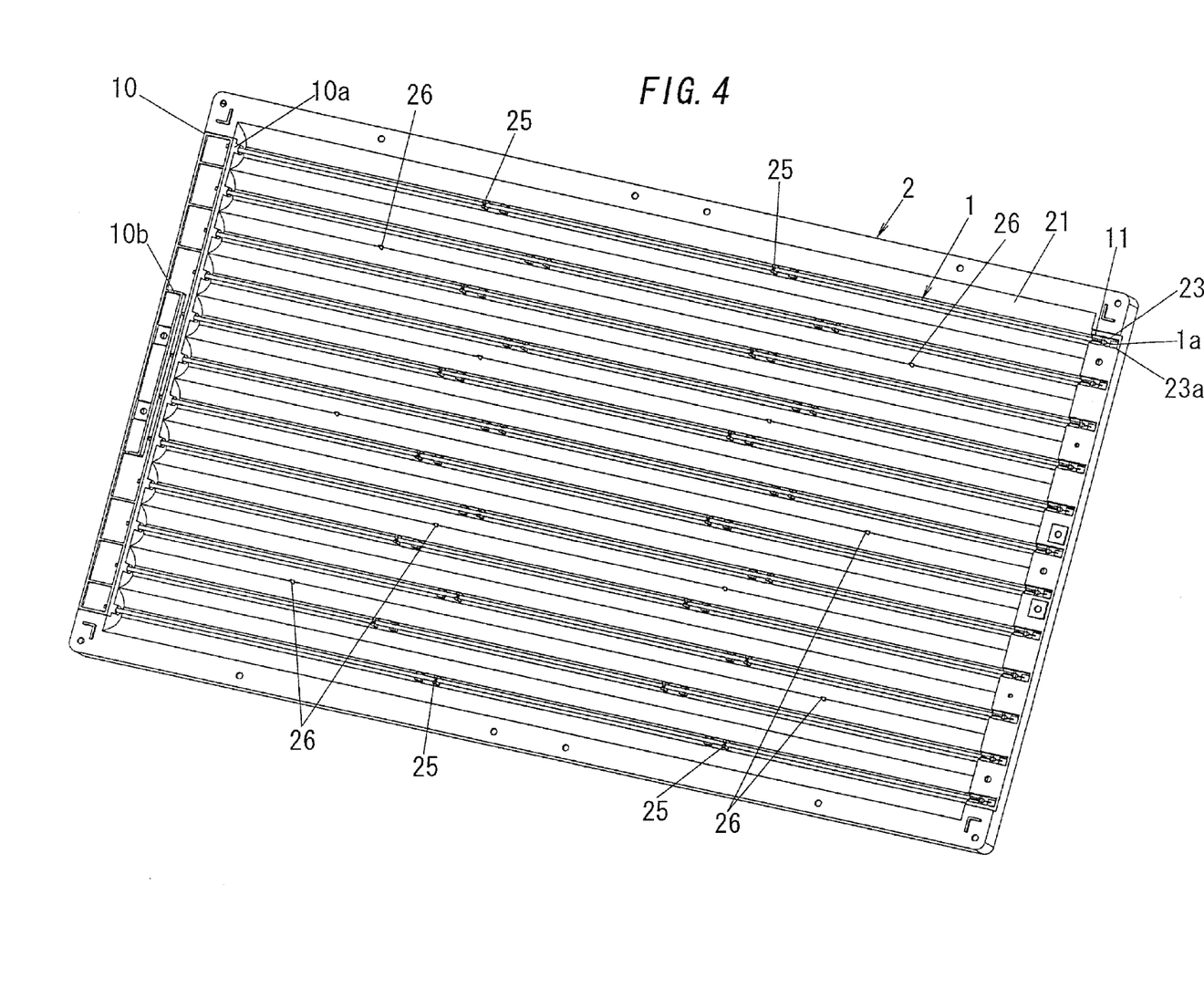
FIG. 4 is a perspective view, seen from a front side, of a discharge lamp, the reflecting plate, and a holding plate of the illuminating device of FIG. 1.
Figure 5:
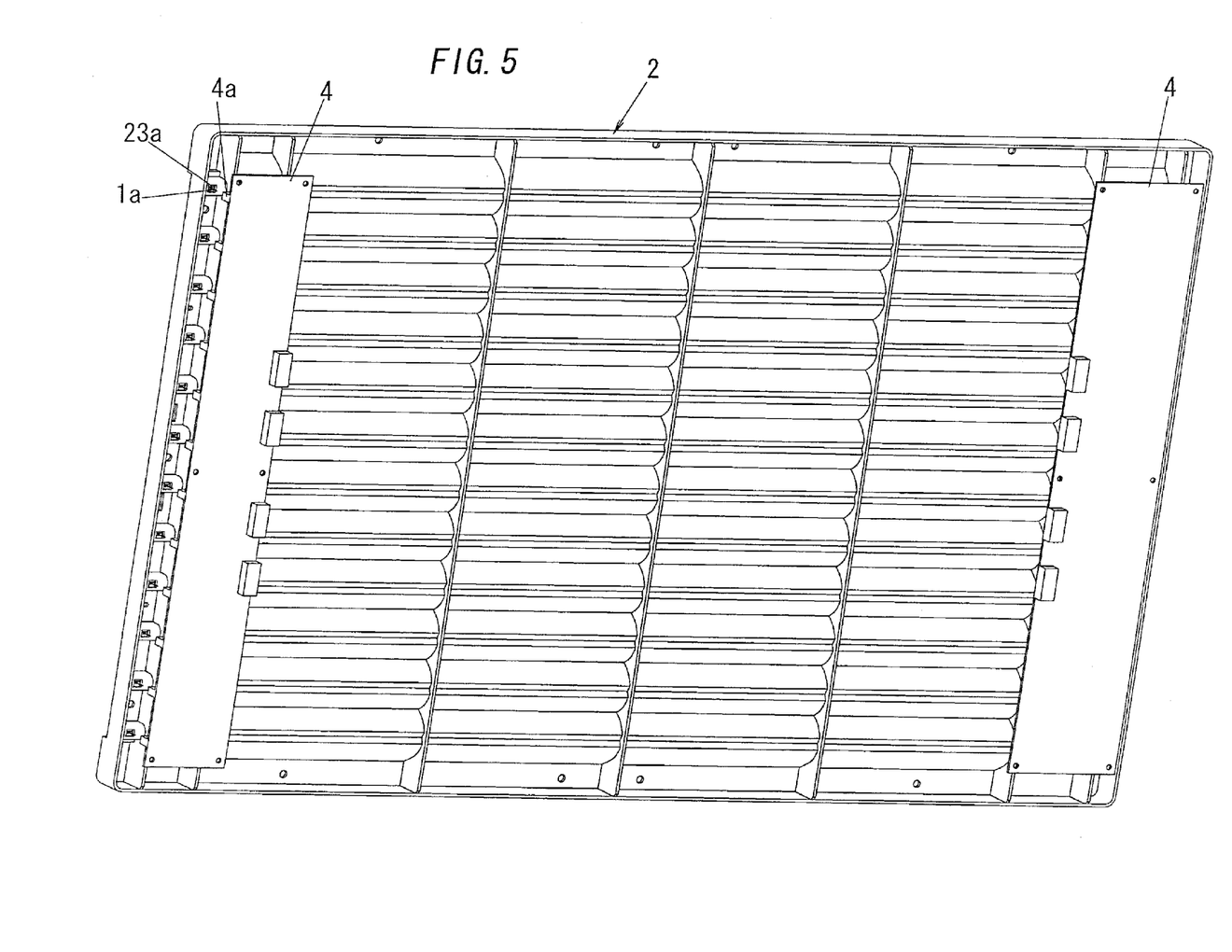
FIG. 5 is a perspective view, seen from a back side, of the reflecting plate and a circuit substrate of the illuminating device of FIG. 1.
Figure 6:
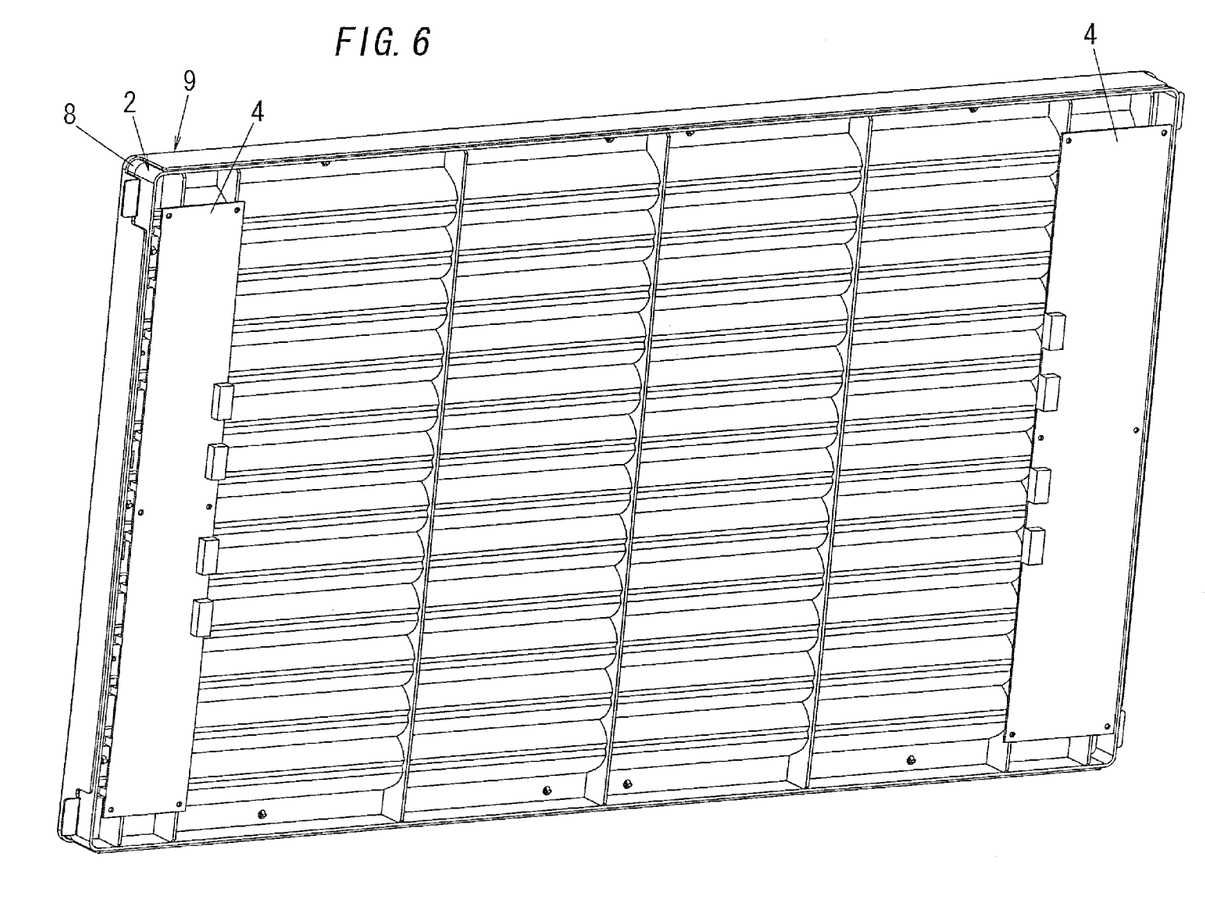
FIG. 6 is a perspective view, seen from a back side, of the illuminating device of FIG. 1.

The reflecting plate 2 is formed from PBT resin into a flat rectangular plate shape as a whole, and a plurality of reflecting surfaces 21 (twelve reflecting surfaces in FIG. 3) each of which has a gutter shape are formed and arranged in generally parallel rows in the front surface of the reflecting plate except a peripheral frame part 20. Generally L-shaped positioning protrusions 22 which make contact with the cutouts 3a to position the diffuser plate 3 are formed at four corners of the front surface of the frame part 20. And, housing recesses 23 each of which is communicated with the reflecting surface 21 and houses an end of the discharge lamp 1 are formed on the front surface of both frame pieces 20a perpendicular to the longitudinal direction of the frame part 20 at generally regular intervals. Each housing recess 23 has a through hole 23a in a bottom surface (back surface) which anteroposteriorly penetrates the bottom surface, and as shown in FIGS. 4 and 5, the terminal pin 1a of the discharge lamp 1 is inserted into the through hole 23a in a state where the end of the discharge lamp 1 is housed in the housing recess 23. Furthermore, a plurality of discharge lamp supporters 25 are provided on an innermost part of the reflecting surface 21 for supporting the discharge lamp (see FIG. 4). As shown in FIG. 1, the discharge lamp supporter 25 comprises a circular arc part 25a having a roughly circular arc shape (major arc shape) in cross section to house a tube wall of the discharge lamp 1 therein and to clip the tube wall, and a column part 25b which is vertically formed from the bottom surface of the housing recess 23 and is connected to the arc part 25a. The discharge lamp supporter 25 is integrally formed with the reflecting plate 2 from PBT resin. By providing the discharge lamp supporter 25, it is possible to keep a constant distance between the reflecting surface 21 and the discharge lamp 1, and it is possible to dispose the discharge lamp accurately at a predetermined position (for example, at a focus of the reflecting surface 21 having a paraboloidal surface shape) (see FIG. 1A). Furthermore, a holding plate 10 is attached to the front surface side of each frame piece 20a of the reflecting plate 2 to hold on the discharge lamp 1 housed in the housing recess 23 from the front side. The holding plate 10 is a molding of synthetic resin, and it has a strip-shaped main part 10a, a protruded wall 10b having a generally U shape in plan view which protrudes forward from a center part of the front surface of the main part 10a, and a plurality of holding pieces 10c (twelve holding pieces in this embodiment) which protrude backward from a back side of the main part 10a and are inserted into respective housing recesses 23 (see FIGS. 3 and 4).

Cylindrical holding members 11 having an opened gutter along an axis direction, respectively, are attached onto both ends of the discharge lamp 1, and when the holding plate 10 is attached to the frame piece 20a by an appropriate method, for example, by a screw or caulking, a distal end of each holding piece 10c makes contact with the holding member 11, and the discharge lamp 1 is indirectly held. The diffuser plate 3 is disposed on the front side of the holding plates 10 in such a way that the recess parts 3b make contact with the protruded walls 10b of the holding plates 10. The shape of the holding member 11 is not limited to a cylindrical shape, but it is preferable that it has a cylindrical shape because, when it has a cylindrical shape, the direction of the opened gutter is free at both ends of the discharge lamp 1, that is, it is not necessary to control an angle of the opened gutter, whereby it is easy to attach the holding member 11 to the terminal pin 1a.

Figure 1B:
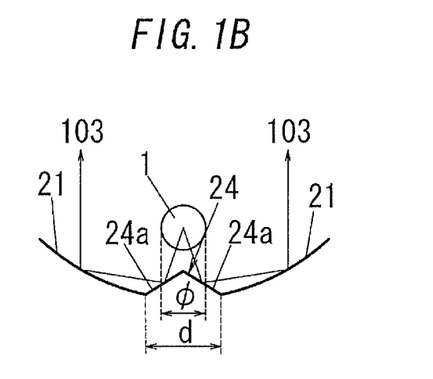
FIG. 1B is a cross-sectional view of a substantial part of the reflecting surface of FIG. 1.
Figure 1C:
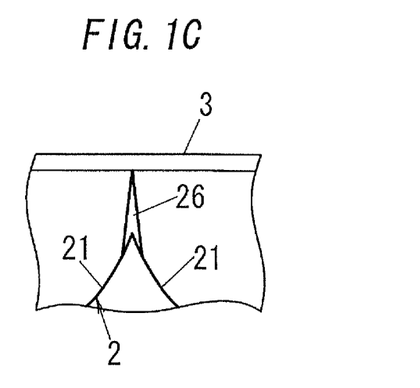
FIG. 1C is a cross-sectional view of a substantial part including a diffuser plate support member of FIG. 1.

At a connection point 21a between the adjacent reflecting surfaces 21 of the reflecting plate 2, a plurality of diffuser plate support members 26 each which has a cone shape and makes contact with the diffuser plate 3 from a back surface side of the diffuser plate to support the diffuser plate 3 are integrally formed with the reflecting plate 2 from PBT resin (see FIGS. 1C and 4). By providing the diffuser plate support members 26, it is possible to support the diffuser plate 3 parallel to the reflecting plate 2.

Figure 2:
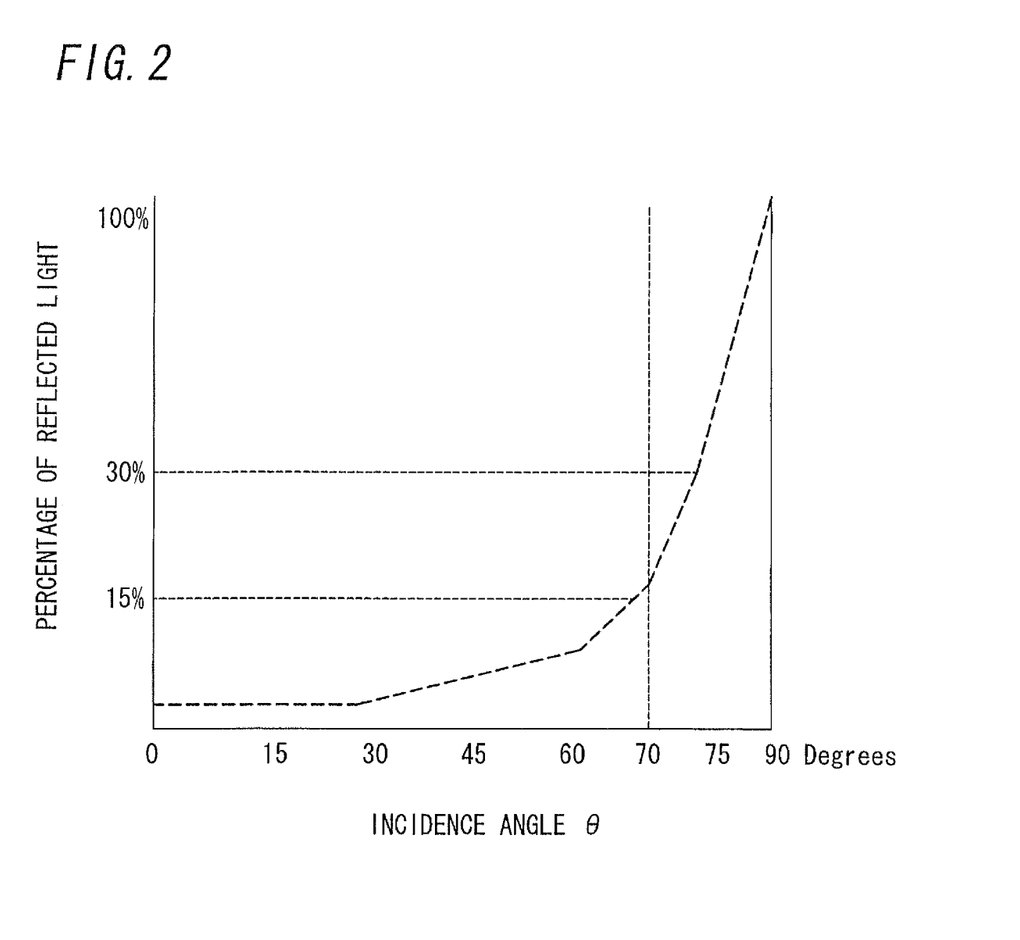
FIG. 2 is a view for explaining an operation of the illuminating device of FIG. 1.
Figure 3:
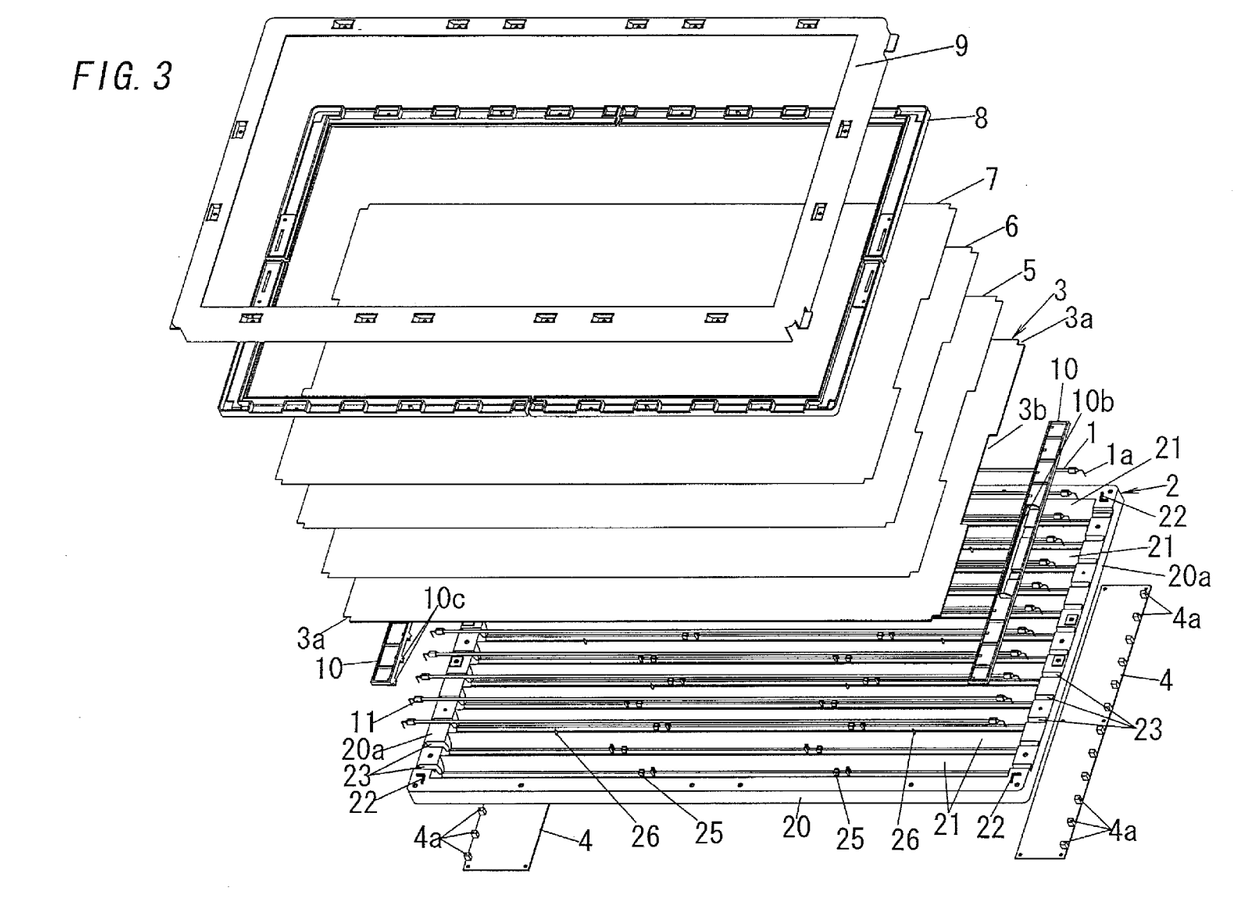
FIG. 3 is an exploded perspective view of the illuminating device of FIG. 1.

As shown in FIG. 1A, each of the reflecting surfaces 21 has a parabolic shape in cross section in a direction perpendicular to an axis direction (that is, a direction perpendicular to a paper surface of FIG. 1A) of the discharge lamps 1 (that is, each of the reflecting surfaces 21 has a parabolic shape in cross section in a direction parallel to the paper surface of FIG. 1A) and is formed into a gutter shape along the axis direction of the discharge lamp 1. Each discharge lamp is housed inside the reflecting surface 21 (preferably, at the focus of the parabola). Adjacent two reflecting surfaces 21 are connected to each other on a side nearer to the diffuser plate 3 than the discharge lamps 1 between adjacent two discharge lamps 1. In this embodiment, a distance between the reflecting surfaces 21, and a positional relation among the reflecting surface 21, the diffuser plate 3, and the discharge lamp 1 are set so that a pseudo light source is formed by light collected near the connection point between the reflecting surfaces 21 out of the emitted light of the discharge lamps 1. Concretely speaking, adjacent two reflecting surfaces 21 are connected to each other on a side nearer to the diffuser plate than the discharge lamps between adjacent two discharge lamps 1 so that an angle (maximum incidence angle) θ max which a straight line (a dashed line 102 in FIG. 1A) that passes the connection point 21a between the adjacent two reflecting surfaces 21 and a central axis of the discharge lamp 1 forms with a normal to the back surface (incidence surface) of the diffuser plate 3 is 70 degrees. Since the back surface of the diffuser plate 3 is not a complete plane, a part of the emitted light which enters the diffuser plate at an incidence angle θ (an angle which incidence light to the diffuser plate 3 forms with the normal to the diffuser plate 3) that exceeds a theoretical critical angle is not totally reflected by the back surface of the diffuse plate, but enters the inside of the diffuser plate 3. However, as shown in FIG. 2, when the incidence angle θ exceeds 70 degrees (that is, 70 degrees<θ), a percentage of the reflected light which is reflected by the back surface of the diffuser plate 3 increases rapidly (exponentially). Therefore, in this embodiment, the maximum value of the incidence angle θ at which the emitted light of the discharge lamps 1 directly enters the diffuser plate 3 is set to 70 degrees (that is, the maximum incidence angle θ max is set to 70 degrees), whereby the light which tries to enter the diffuser plate at an angle which exceeds the incidence angle θ at which the percentage of the reflected light increases rapidly (that is, the incidence angle θ=70 degrees) is reflected by the reflecting surface 21 and then enters the diffuser plate 3. Therefore, a pseudo light source is formed by light which was reflected by the reflecting surface 21 and collected near the connection point between the adjacent reflecting surfaces 21 out of the emitted light of the discharge lamps 1, whereby brightness between the adjacent discharge lamps 1 is increased, and it is possible to reduce the unevenness in brightness. Furthermore, since the discharge lamp 1 is housed inside the reflecting surface whose cross-sectional shape is a parabola, it is possible to reduce the distance between the reflecting plate 2 and the diffuser plate 3, as compared with the prior art, and to reduce the thickness dimension in the anteroposterior direction. The reflection property shown in FIG. 2 is a reflection property of the diffuser plate 3 which is a molding formed by an acrylic resin molding material made by Mitsubishi Rayon Co., Ltd., (product name: ACRYPET (registered mark)). However, as long as the incidence plane is a mirror plane, it is conceivable that the diffuser plate 3 shows a similar property regardless of whether a light diffusing agent is added or not.

Furthermore, as shown in FIG. 1A, it is preferable that the distance L between the reflecting plate 2 and the diffuser plate 3, that is, a distance between the connection point 21a of the adjacent reflecting surfaces 21 and the diffuser plate 3 is set so that the reflected light (see full lines 100, 101 and a dashed line 102 in FIG. 1A) which goes beyond the connection point 21a and reflected by the back surface of the diffuser plate 3 out of the emitted light of the discharge lamp 1 housed inside one reflecting surface 21 can be reflected by the reflecting surface located adjacent to the above one reflecting surface 21 (in other words, by a part of the reflecting surface 21 which is located across the discharge lamp 1 and away from the connection point 21a). In this case, the reflected light (reflected component) which was reflected by the incidence plane of the diffuser plate 3 out of the incident light (see the full lines 100 and 101, and the dashed line 102) whose incidence angle is less than or equal to the maximum incidence angle θ max enters the incidence plane of the diffuser plate 3 again at an incidence angle which is smaller than the first incidence angle after it is reflected by the next reflecting surface 21 (secondary reflection). Therefore, a tertiary or quartic reflection becomes less likely to occur (that is, stray light which is reflected repeatedly is prevented), so it is possible to increase an incident efficiency to the diffuser plate 3.

By the way, a protrusion part 24 having a triangular shape in cross section and protruding forward is formed along the axis direction of the discharge lamp 1 at the innermost part (at the bottom in FIG. 1A) of each reflecting surface 21 which faces the discharge lamp 1, and a front surface of the protrusion part 24 is an incline 24a for reflecting the emitted light of the discharge lamp 1 to the reflecting surface located outside the innermost part. If the incline 24a is not formed, brightness near the discharge lamp 1 is increased by light reflected by the innermost part of a paraboloidal surface. However, as shown in FIG. 4B, by providing the incline 24a, light which enters the innermost part (the incline 24a) is reflected by the reflecting surface 21 at a location away from the discharge lamp 1, and enters the diffuser plate 3 (see a broken line 103 in FIG. 1B). Therefore, the brightness near the discharge lamp 1 is relatively reduced, whereby it is possible to reduce the unevenness of the brightness. In order to prevent the unevenness in the brightness, as shown in FIG. 1B, it is preferable that a width of the incline 24a is set larger than a projected area of the discharge lamp 1 (that is, the diameter φ of the discharge lamp 1) with respect to the innermost part of the reflecting surface 21, (in other words, it is preferable that the incline 24a is extended to the outside of the projected area of the discharge lamp).

When the incline 24a is provided, since the light which enters the diffuser plate 3 after it was reflected by the outside of the innermost part of the reflecting surface 21 at which the protrusion part 24 is provided is increased, the brightness near the connection point 21a may be increased more than necessary. So, it is preferable that regular reflectance of portions other than the bottom portion of the reflecting surface 21 including the incline 24 is set to smaller than that of the bottom portion of the reflecting surface 21 by making a surface of the bottom portion of the reflecting surface 21 including the incline 24 a mirror plane and forming many concavities and convexities in the surface of the portion outside the bottom portion to form a diffusing surface. In this case, it is possible to prevent an undue increase in the brightness near the connection point 21a, whereby it is possible to reduce the unevenness in the brightness more.

In this embodiment, acrylic resin is explained as a translucent material for forming the diffuser plate 3. However, in order to obtain a desired optical characteristic, a thermoplastic resin material, such as polycarbonate resin, polyethylene terephthalate resin, ABS resin, ASA resin, AES resin, polypropylene resin, cyclic polyolefin resin, polystyrene resin, acrylic resin, methacryl-styrene copolymer, and polyethylene naphthalate resin, may be used. Especially, it is preferable that polycarbonate resin, cyclic polyolefin resin, polystyrene resin, acrylic resin, or methacryl-styrene copolymer, which is capable of obtaining good balance between the translucency and the light diffusion property, is used.

It's often the case that a light diffusion agent is added to the thermoplastic resin material to diffuse light. As the light diffusion agent, for example, an inorganic particle, such as oxidized titanium, barium sulfate, zinc oxide, magnesium oxide, calcium carbonate, and a hollow silica fine particle, or an organic particle, such as cross-linked styrene beads, cross-linked acrylic beads, silicon resin, and silicon rubber, may be used. Without affecting the effect of the present invention, various additive, such as colorant, mold-releasing agent, filler, antioxidant, stabilizer, ultraviolet absorber, flame retardant, flame retardant auxiliary agent, impact modifier, lubricant, crystallization promoter, and so on may be blended, and an well-known additive can be used without limit.

The diffuser plate 3 may be obtained by molding the thermoplastic resin material using a generally well-known molding method for the thermoplastic resin material, such as an injection molding process, an extrusion molding method, a compression molding method, a blow molding method, a transfer molding method, a vacuum molding method, and an injection method. However, from a viewpoint of productivity, it is preferable that an injection molding process or an extrusion molding method is used. The surface of the diffuser plate 3 may have a grain structure and so on so as to obtain a desired optical characteristic and a lamp balance and to prevent unevenness of the brightness due to contact with other parts. The forming method of the grain structure is not particularly limited, but a method which uses a die having a grain structure for molding, a method in which grain is formed by shot blast after molding may be included. Furthermore, in order to prevent adherence of dust which affects unevenness of the brightness, a film having an antistatic function may be formed on the surface. Such a film having the antistatic function can be formed by using a well-known method, such as spraying, roll coating, a dipping method, laminating, vacuum deposition method, and a sputtering method.

If an interior portion of diffuser plate 3 is a structure in which fine hollow cells are dispersed, or a structure in which continuous hollow parts are partly formed, there is a possibility that the light diffusion property is increased. Here, when the diffuser plate 3 is formed into a molding which is 2 millimeters in thickness from a thermoplastic resin material for example, all light transmittances at wavelengths of 450 to 800 nanometers is more than or equal to 50%.

Furthermore, although, in this embodiment, the reflecting plate 2 is formed from PBT resin, a molding material of the reflecting plate 2 is not limited to PBT resin. However, in order to reproduce an optically-designed shape faithfully and to compound a plurality of parts, it is preferable that a thermoplastic resin material is used. Furthermore, in order to obtain a desired optical characteristic, it is preferable that the reflecting plate 2 is formed by molding a thermoplastic resin material, such as polycarbonate resin, polybutylene terephthalate resin, polyethylene terephthalate resin, polypropylene resin, ABS resin, ASA resin, AES resin, 6-nylon resin, polysulfone resin, 9T nylon resin, cyclic polyolefin resin, acrylic resin, polyphthalamide resin, and polyethylene naphthalate resin. Especially, polycarbonate resin or polybutylene terephthalate resin, which can obtain a high light reflecting property when it is colored with white color, is used preferably. Without affecting the effect of the present invention, various additives, such as colorant, mold-releasing agent, filler, antioxidant, stabilizer, ultraviolet absorber, flame retardant, flame retardant auxiliary agent, impact modifier, lubricant, crystallization promoter, and so on may be blended to the thermoplastic resin material, and a well-known additive can be used without limit. As the colorant, for example, an inorganic pigment, such as oxidized titanium, barium sulfate, zinc oxide, magnesium oxide, calcium carbonate, and a hollow silica fine particle, or an organic pigment, such as organic dye, cross-linked styrene beads, cross-linked acrylic beads, silicon resin, and silicon rubber, can be adduced. As the mold-releasing agent, vegetable wax such as carnauba wax and rice wax, animal wax such as bees wax and lanolin, mineral wax such as montan wax, petroleum wax such as paraffin wax polyethylene wax, grease wax such as ricinus, derivative thereof, fatty acid, derivative thereof, can be adduced. As the filler, fillers of various types and shapes can be adduced. For example, fibrous filler such as glass fiber, carbon fiber, aramid fiber, metal fiber, asbestos, and whisker, nature or synthesis filler having a spherical shape, a plate-like shape, or an amorphous powder-particle-like shape, such as glass beads, glass flake, calcium carbonate, talc, mica, aluminum oxide, magnesium hydroxide, beryllium oxide, calcium silicate, clay, and metal powder. As the antioxidant, phenolic compound such as 2,6-di-t-butyl-4-methyl phenol, tetrakis (methylene-3-(3,5-di-t-butyl-4-hydroxyphenyl)propionate) methane, tris(3,5-di-t-butyl-4-hydroxybenzyl)isocyanurate, sulphur system compound such as dilauryl-3,3'-thiodipropionate, dimyristyl-3,3'-thiodipropionate, and phosphorus compound such as tris nonylphenyl phosphate, distearyl pentaerythritol di phosphate, can be adduced. As the stabilizer, benzotriazole series compound including 2-(2'-hydroxy-5'-methylphenyl)benzotriazole, benzophenone series compound such as 2,4-dihydroxybenzophenone, and phosphoric ester such as mono or distearyl phosphate and trimethyl phosphate, can be adduced. Such various additives can be used in conjunction with one another since synergistic effect may be obtained by combining two or more kinds. In addition, for example, the additive which was explained as antioxidant may work as a stabilizer or an ultraviolet absorber. And, the additive which was explained as stabilizer may have an antioxidant effect and an ultraviolet absorption effect. That is, the above classification is expedient classification, and it does not mean to limit actions.

As the ultraviolet absorber, for example, benzophenone series ultraviolet absorber as typified by 2-hydroxy-4-n-dodecyloxybenzophenone, 2,2'-dihydroxy-4,4'-dimethoxy-benzophenone, bis(5-benzoyl-4-hydroxy-2-methoxyphenyl) methane can be adduced. In addition, as the ultraviolet absorber, for example, benzotriazole series ultraviolet absorber as typified by a condensation product of 2-(2'-hydroxy-5'-methylphenyl)benzotriazole, 2-(2'-hydroxy-3',5'-di-tert-amylphenyl)benzotriazole, 2-(2'-hydroxy-3',5'-bis(α, α'-dimethylbenzyl)phenylbenzotriazole, 2,2'methylenebis[4-(1,1,3,3-tetramethylbutyl)-6-(2H-benzotriazole-2-yl)phenol], and methyl-3-[3-tert-butyl-5-(2H-benzotriazole-2-yl)-4-hydroxyphenylpropionate-polyethyleneglycol can be adduced. Furthermore, as the ultraviolet absorber, for example, hydroxyphenyltriazine series compound, such as 2-(4,6-diphenyl-1,3,5-triazine-2-yl)-5-hexyloxyphenol, 2-(4,6-bis(2,4-dimethylphenyl)-1,3,5-triazine-2-yl)-5-hexyloxyphenol can be adduced. Furthermore, hindered amine light stabilizer as typified by bis(2,2,6,6-tetramethyl-4-piperidyl)sebacate, bis(1,2,2,6,6-pentamethyl-4-piperidyl)sebacate, tetrakis(2,2,6,6-tetramethyl-4-piperidyl)-1,2,3,4-butanetetracarboxylate, tetrakis(1,2,2,6,6-pentamethyl-4-piperidyl)-1,2,3,4-butanetetracarboxylate, poly[[6-(1,1,3,3-tetramethylbutyl)amino-1,3,5-triazine-2,4-diyl][(2,2,6,6-tetramethylpiperidyl)imino]hexamethylene[(2,2,6,6-tetramethylpiperidyl)imino]], polymethylpropyl3-oxy-[4-(2,2,6,6-tetramethyl)piperidinyl]siloxane, can be included, and such a light stabilizer can exert good performance in terms of weathering agent and so on when being used in combination with the above-mentioned ultraviolet absorber and various antioxidants. The fire retardant is halogen series, phosphoester series, metallic salt series, red phosphorus, silicon series, or metallic hydrate series, and it also includes drop inhibitor. In addition, fluorescent bleach, light storage pigment, fluorescent dye, flow modifier, inorganic or organic antimicrobial, photocatalytic system antifoulant, impact modifier as typified by graft rubber, infrared ray absorbent, photochromic agent can be adduced.

The reflecting plate 2 can may obtained by molding a thermoplastic resin material using a generally well-known molding method for the thermoplastic resin material, such as an injection molding process, an injection compression molding method, a gas-assist injection molding method, a gas-press injection molding method, a counter pressure injection molding method, a heat decomposition-type foaming molding method, a gas injection-type foaming molding method, an extrusion molding method, a compression molding method, a blow molding method, a transfer molding method, a vacuum molding method, and an injection method. However, from a viewpoint of accurate reproducing of a desired shape and high productivity, it is preferable that an injection molding method, an injection compression molding method, or a gas-assist injection molding method is used.

The surface of the reflecting plate 2 may be made to a burnished condition with high surface smoothing property or a half-frosted or a frosted condition in which a grain structure is formed so as to obtain a desired optical characteristic and lamp uniformity. The method for forming the grain structure is not particularly limited. For example, a method which uses a die having a grain structure for molding, and a method in which grain is formed by shot blast after molding may be adduced.

If an interior portion of reflecting plate 2 is formed into a structure in which fine hollow cells are dispersed, or a structure in which continuous hollow parts are partly formed, reflectance may be increased, a hiding property (which relates to prevention of light leakage) may be increased, and warpage may be reduced. Here, when the reflecting plate 2 is formed into a molding which is 2 millimeters in thickness from a thermoplastic resin material, all light reflectances at wavelengths of 450 to 800 nanometers is more than or equal to 95%.

Although, in this embodiment, the reflecting plate 2 is formed from various synthetic resins, the reflecting plate 2 may be formed by coating a steel plate. In this case, a while reflecting surface having high reflectance over an almost entirely range of wavelength of a visible light and which is always stable can be obtained by forming the reflecting surface by applying a paint which is a visible light reflecting powdered paint including polyester resin having acid number of 20 to 80, solid epoxy compound having epoxy equivalent of 99 to 2000, and titanium oxide having a refractive index of 2.7 or more, wherein the titanium oxide has a globular crystal structure and has a covering layer of alumina and silica formed by chlorine method process and has an average grain diameter of 0.2 to 0.3 micrometers, and which is 15 to 20% in PVC (38 to 54% in PWC) and to which phosphorous additives as curing catalyst and as antioxidant of 0.02 to 1% by weight are added respectively. Or, such a while reflecting surface can be also obtained by forming the reflecting surface by applying a powdered paint having a less volatilization component which is obtained by appropriately combining one or more polyester resins having acid number of 20 to 80, one or more solid epoxy compounds having epoxy equivalent of 99 to 2000, titanium oxide having a refractive index of 2.7 or more, and additives such as defoaming agent to one another.

The invention claimed is:

1. An illuminating device for a liquid crystal panel which illuminates a transmissive liquid crystal panel from behind, said illuminating device comprising:
   a plurality of straight-tube type discharge lamps arranged roughly parallel to a back surface of the liquid crystal panel,
   a reflecting plate disposed behind said discharge lamps to reflect light emitted from said discharge lamps forward,
   a plate-shaped diffuser plate disposed between said liquid crystal panel and said discharge lamps to diffuse incident light,
   wherein
   said reflecting plate has a plurality of reflecting surfaces each of which has one parabolic shape in cross section in a direction perpendicular to an axis direction of said discharge lamps and is formed into a gutter shape along the axis direction of the discharge lamps, each of said discharge lamps being housed inside each of the plurality of reflecting surfaces so as to be located at one focus of said each of the plurality of reflecting surfaces,
   adjacent reflecting surfaces being connected to each other on a side nearer to said diffuser plate than said discharge lamps so as to form a pseudo light source by light collected near a connection point between said reflecting surfaces out of emitted light from said discharge lamps wherein a protrusion part having a triangular shape in cross section and protruding toward said discharge lamp is formed along the axis direction of said discharge lamp at an innermost part of said reflecting surface which faces said discharge lamp, said protrusion part having a flat incline for reflecting the emitted light of said discharge lamp to said reflecting surface located outside said innermost part of said reflecting surface.

2. The illuminating device for a liquid crystal panel as set forth in claim 1, wherein a distance between said reflecting plate and said diffuser plate is set so that reflected light which goes beyond said connection point and reflected by a back surface of said diffuser plate out of the emitted light of said discharge lamp housed inside one reflecting surface can be reflected by said reflecting surface located adjacent to the one reflecting surface.

3. The illuminating device for a liquid crystal panel as set forth in claim 1, wherein said incline is extended to the outside of a projected area of said discharge lamp with respect to the innermost part of said reflecting surface.

4. The illuminating device for a liquid crystal panel as set forth in claim 1, wherein regular reflectance of portions other than said flat incline of said reflecting surface is smaller than that of said flat incline.

5. The illuminating device for a liquid crystal panel as set forth in claim 1, further comprising:

a discharge lamp support member for supporting said discharge lamp at an innermost part of said reflecting surface which faces said discharge lamp.

6. The illuminating device for a liquid crystal panel as set forth in claim 1, further comprising:

a diffuser plate support member which makes contact with said diffuser plate from a back surface side of said diffuser plate to support said diffuser plate at said connection point between said adjacent reflecting surfaces in said reflecting plate.

* * * * *